(12) United States Patent
Mandai et al.

(10) Patent No.: US 12,442,926 B2
(45) Date of Patent: Oct. 14, 2025

(54) TIME-OF-FLIGHT DEPTH SENSING WITH IMPROVED LINEARITY

(71) Applicant: Apple Inc., Cupertino, CA (US)

(72) Inventors: Shingo Mandai, Mountain View, CA (US); Cristiano L Niclass, San Jose, CA (US); Nadav Fine, Herzliya (IL); Oz Barak, Tel Aviv (IL); Rahmi Hezar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 889 days.

(21) Appl. No.: 17/548,541

(22) Filed: Dec. 12, 2021

(65) Prior Publication Data

US 2022/0244391 A1 Aug. 4, 2022

Related U.S. Application Data

(60) Provisional application No. 63/145,504, filed on Feb. 4, 2021.

(51) Int. Cl.
*G01S 17/894* (2020.01)
*G01B 11/22* (2006.01)
(Continued)

(52) U.S. Cl.
CPC ............ *G01S 17/894* (2020.01); *G01B 11/22* (2013.01); *G01S 7/4816* (2013.01); *G01S 7/4865* (2013.01)

(58) Field of Classification Search
CPC ......... G01B 11/22; G01S 17/02; G01S 17/04; G01S 17/06; G01S 17/08; G01S 17/10;
(Continued)

(56) References Cited

U.S. PATENT DOCUMENTS

| | | | |
|---|---|---|---|
| 4,623,237 A | 11/1986 | Kaneda et al. | |
| 4,757,200 A | 7/1988 | Shepherd | |

(Continued)

FOREIGN PATENT DOCUMENTS

| | | |
|---|---|---|
| CA | 2605339 C | 10/1994 |
| CN | 201054040 Y | 4/2008 |

(Continued)

OTHER PUBLICATIONS

U.S. Appl. No. 17/079,548 Office Action dated Mar. 3, 2023.
(Continued)

*Primary Examiner* — John R Lee
(74) *Attorney, Agent, or Firm* — MEITAR PATENTS LTD; Daniel Kligler

(57) ABSTRACT

Optical sensing apparatus includes a radiation source, which directs a series of optical pulses toward a target scene. A first array of single-photon detectors receives optical radiation that is reflected from the target scene and outputs electrical pulses in response to incident photons. A second array of counters aggregates and counts the electrical pulses output by the single-photon detectors over respective periods indicated by respective gating signals applied to the counters. Control logic applies the respective gating signals to the counters, in each of a sequence of image frames, so as to cause different ones of the counters to aggregate and count the electrical pulses output by one or more of the single-photon detectors over different, respective gating intervals relative to each of the optical pulses, and to sum the frame histograms generated with different temporal offsets so as to compute and output a cumulative histogram.

18 Claims, 7 Drawing Sheets

(51) Int. Cl.
*G01S 7/481* (2006.01)
*G01S 7/4865* (2020.01)

(58) Field of Classification Search
CPC .......... G01S 17/14; G01S 17/18; G01S 17/88;
G01S 17/89; G01S 17/894; G01S 17/90;
G01S 17/93; G01S 17/931; G01S 17/933;
G01S 17/95; G01S 7/48; G01S 7/4808;
G01S 7/481; G01S 7/4811; G01S 7/4812;
G01S 7/4813; G01S 7/4814; G01S
7/4815; G01S 7/4816; G01S 7/4817;
G01S 7/4818; G01S 7/483; G01S 7/484;
G01S 7/486; G01S 7/4861; G01S 7/4863;
G01S 7/4865; G01S 7/4866; G01S 7/487
See application file for complete search history.

(56) References Cited

U.S. PATENT DOCUMENTS

| | | |
|---|---|---|
| 5,164,823 A | 11/1992 | Keeler |
| 5,270,780 A | 12/1993 | Moran et al. |
| 5,373,148 A | 12/1994 | Dvorkis et al. |
| 5,699,149 A | 12/1997 | Kuroda et al. |
| 6,301,003 B1 | 10/2001 | Shirai et al. |
| 6,384,903 B1 | 5/2002 | Fuller |
| 6,710,859 B2 | 3/2004 | Shirai et al. |
| 7,126,218 B1 | 10/2006 | Darveaux et al. |
| 7,193,690 B2 | 3/2007 | Ossig et al. |
| 7,303,005 B2 | 12/2007 | Reis et al. |
| 7,405,812 B1 | 7/2008 | Bamji |
| 7,508,496 B2 | 3/2009 | Mettenleiter et al. |
| 7,800,067 B1 | 9/2010 | Rajavel et al. |
| 7,800,739 B2 | 9/2010 | Rohner et al. |
| 7,812,301 B2 | 10/2010 | Oike et al. |
| 7,969,558 B2 | 6/2011 | Hall |
| 8,193,482 B2 | 6/2012 | Itsler |
| 8,259,293 B2 | 9/2012 | Andreou |
| 8,275,270 B2 | 9/2012 | Shushakov et al. |
| 8,279,418 B2 | 10/2012 | Yee et al. |
| 8,355,117 B2 | 1/2013 | Niclass |
| 8,405,020 B2 | 3/2013 | Menge |
| 8,594,425 B2 | 11/2013 | Gurman et al. |
| 8,675,181 B2 | 3/2014 | Hall |
| 8,736,818 B2 | 5/2014 | Weimer et al. |
| 8,766,164 B2 | 7/2014 | Sanfilippo et al. |
| 8,766,808 B2 | 7/2014 | Hogasten |
| 8,891,068 B2 | 11/2014 | Eisele et al. |
| 8,925,814 B1 | 1/2015 | Schneider et al. |
| 8,963,069 B2 | 2/2015 | Drader et al. |
| 9,002,511 B1 | 4/2015 | Hickerson et al. |
| 9,016,849 B2 | 4/2015 | Fujisawa et al. |
| 9,024,246 B2 | 5/2015 | Jiang et al. |
| 9,052,356 B2 | 6/2015 | Chu et al. |
| 9,076,707 B2 | 7/2015 | Harmon |
| 9,267,787 B2 | 2/2016 | Shpunt et al. |
| 9,335,220 B2 | 5/2016 | Shpunt et al. |
| 9,354,332 B2 | 5/2016 | Zwaans et al. |
| 9,386,299 B2 | 7/2016 | Shpunt et al. |
| 9,465,111 B2 | 10/2016 | Wilks et al. |
| 9,516,248 B2 | 12/2016 | Cohen et al. |
| 9,709,678 B2 | 7/2017 | Matsuura |
| 9,736,459 B2 | 8/2017 | Mor et al. |
| 9,739,881 B1 | 8/2017 | Pavek et al. |
| 9,761,049 B2 | 9/2017 | Naegle et al. |
| 9,786,701 B2 | 10/2017 | Mellot et al. |
| 9,810,777 B2 | 11/2017 | Williams et al. |
| 9,874,635 B1 | 1/2018 | Eichenholz et al. |
| 10,063,844 B2 | 8/2018 | Adam et al. |
| 10,067,224 B2 | 9/2018 | Moore et al. |
| 10,132,616 B2 | 11/2018 | Wang |
| 10,215,857 B2 | 2/2019 | Oggier et al. |
| 10,269,104 B2 | 4/2019 | Hannuksela et al. |
| 10,386,487 B1 | 8/2019 | Wilton et al. |
| 10,424,683 B1 | 9/2019 | Do Valle et al. |
| 10,613,203 B1 | 4/2020 | Rekow et al. |
| 10,782,393 B2 | 9/2020 | Dussan et al. |
| 11,681,028 B2 * | 6/2023 | Laifenfeld ............ H10F 30/225 |
| | | 250/214.1 |
| 11,693,102 B2 | 7/2023 | Kudla et al. |
| 11,733,359 B2 * | 8/2023 | Fine ........................ G01S 17/18 |
| | | 356/5.01 |
| 12,140,708 B2 * | 11/2024 | Fine ...................... G01S 7/4865 |
| 2001/0020673 A1 | 9/2001 | Zappa et al. |
| 2002/0071126 A1 | 6/2002 | Shirai et al. |
| 2002/0131035 A1 | 9/2002 | Watanabe et al. |
| 2002/0154054 A1 | 10/2002 | Small |
| 2002/0186362 A1 | 12/2002 | Shirai et al. |
| 2004/0051859 A1 | 3/2004 | Flockencier |
| 2004/0135992 A1 | 7/2004 | Munro |
| 2004/0212863 A1 | 10/2004 | Schanz et al. |
| 2005/0018200 A1 | 1/2005 | Guillermo et al. |
| 2006/0044546 A1 | 3/2006 | Lewin et al. |
| 2006/0106317 A1 | 5/2006 | McConnell et al. |
| 2006/0138315 A1 * | 6/2006 | Williams ............... G01T 1/2985 |
| | | 250/252.1 |
| 2006/0176469 A1 | 8/2006 | O'Connor et al. |
| 2007/0145136 A1 | 6/2007 | Wiklof et al. |
| 2007/0164004 A1 | 7/2007 | Matsuda et al. |
| 2008/0231498 A1 | 9/2008 | Menzer et al. |
| 2009/0009747 A1 | 1/2009 | Wolf et al. |
| 2009/0262760 A1 | 10/2009 | Krupkin et al. |
| 2009/0273770 A1 | 11/2009 | Bauhahn et al. |
| 2009/0275841 A1 | 11/2009 | Melendez et al. |
| 2010/0019128 A1 | 1/2010 | Itzler |
| 2010/0045965 A1 | 2/2010 | Meneely |
| 2010/0096459 A1 | 4/2010 | Gurevich |
| 2010/0121577 A1 | 5/2010 | Zhang et al. |
| 2010/0250189 A1 | 9/2010 | Brown |
| 2010/0286516 A1 | 11/2010 | Fan et al. |
| 2010/0309288 A1 | 12/2010 | Stettner et al. |
| 2011/0006190 A1 | 1/2011 | Alameh et al. |
| 2011/0128524 A1 | 6/2011 | Vert et al. |
| 2011/0181864 A1 | 7/2011 | Schmitt et al. |
| 2011/0279366 A1 | 11/2011 | Lohbihler |
| 2012/0038904 A1 | 2/2012 | Fossum et al. |
| 2012/0075615 A1 | 3/2012 | Niclass et al. |
| 2012/0132636 A1 | 5/2012 | Moore |
| 2012/0153120 A1 | 6/2012 | Baxter |
| 2012/0154542 A1 | 6/2012 | Katz et al. |
| 2012/0176476 A1 | 7/2012 | Schmidt et al. |
| 2012/0249998 A1 | 10/2012 | Eisele et al. |
| 2012/0287242 A1 | 11/2012 | Gilboa et al. |
| 2012/0294422 A1 | 11/2012 | Cheung et al. |
| 2013/0015331 A1 | 1/2013 | Birk et al. |
| 2013/0079639 A1 | 3/2013 | Hoctor et al. |
| 2013/0092846 A1 | 4/2013 | Henning et al. |
| 2013/0107016 A1 | 5/2013 | Federspiel |
| 2013/0208258 A1 | 8/2013 | Eisele et al. |
| 2013/0236171 A1 | 9/2013 | Saunders |
| 2013/0258099 A1 | 10/2013 | Ovsiannikov et al. |
| 2013/0278917 A1 | 10/2013 | Korekado et al. |
| 2013/0300838 A1 | 11/2013 | Borowski |
| 2013/0342835 A1 | 12/2013 | Blacksberg |
| 2014/0027606 A1 | 1/2014 | Raynor et al. |
| 2014/0071433 A1 | 3/2014 | Eisele et al. |
| 2014/0077086 A1 | 3/2014 | Batkilin et al. |
| 2014/0078491 A1 | 3/2014 | Eisele et al. |
| 2014/0162714 A1 | 6/2014 | Kim et al. |
| 2014/0191115 A1 | 7/2014 | Webster et al. |
| 2014/0198198 A1 | 7/2014 | Geissbuehler et al. |
| 2014/0231630 A1 | 8/2014 | Rae et al. |
| 2014/0240317 A1 | 8/2014 | Go et al. |
| 2014/0240691 A1 | 8/2014 | Mheen et al. |
| 2014/0268127 A1 | 9/2014 | Day |
| 2014/0300907 A1 | 10/2014 | Kimmel |
| 2014/0321862 A1 | 10/2014 | Frohlich et al. |
| 2014/0353471 A1 | 12/2014 | Raynor et al. |
| 2015/0041625 A1 | 2/2015 | Dutton et al. |
| 2015/0062558 A1 | 3/2015 | Koppal et al. |
| 2015/0131080 A1 | 5/2015 | Retterath et al. |
| 2015/0163429 A1 | 6/2015 | Dai et al. |
| 2015/0192676 A1 | 7/2015 | Kotelnikov et al. |
| 2015/0200222 A1 | 7/2015 | Webster |
| 2015/0200314 A1 | 7/2015 | Webster |

(56) References Cited

U.S. PATENT DOCUMENTS

| | | |
|---|---|---|
| 2015/0204978 A1 | 7/2015 | Hammes et al. |
| 2015/0260830 A1 | 9/2015 | Gosh et al. |
| 2015/0285625 A1 | 10/2015 | Deane et al. |
| 2015/0362585 A1 | 12/2015 | Gosh et al. |
| 2015/0373322 A1 | 12/2015 | Goma et al. |
| 2016/0003944 A1 | 1/2016 | Schmidtke et al. |
| 2016/0041266 A1 | 2/2016 | Smits |
| 2016/0072258 A1 | 3/2016 | Seurin et al. |
| 2016/0080709 A1 | 3/2016 | Viswanathan et al. |
| 2016/0182101 A1 | 6/2016 | Marcovic et al. |
| 2016/0259038 A1 | 9/2016 | Retterath et al. |
| 2016/0259057 A1 | 9/2016 | Ito |
| 2016/0274222 A1 | 9/2016 | Yeun |
| 2016/0334508 A1 | 11/2016 | Hall et al. |
| 2016/0344965 A1 | 11/2016 | Grauer |
| 2017/0006278 A1 | 1/2017 | Vandame et al. |
| 2017/0038459 A1 | 2/2017 | Kubacki et al. |
| 2017/0052065 A1 | 2/2017 | Sharma et al. |
| 2017/0067734 A1 | 3/2017 | Heidemann et al. |
| 2017/0068393 A1 | 3/2017 | Viswanathan et al. |
| 2017/0131388 A1 | 5/2017 | Campbell et al. |
| 2017/0131718 A1 | 5/2017 | Matsumura et al. |
| 2017/0139041 A1 | 5/2017 | Drader et al. |
| 2017/0176577 A1 | 6/2017 | Halliday |
| 2017/0176579 A1 | 6/2017 | Niclass et al. |
| 2017/0179173 A1 | 6/2017 | Mandai et al. |
| 2017/0184450 A1 | 6/2017 | Doylend et al. |
| 2017/0184704 A1 | 6/2017 | Yang et al. |
| 2017/0184709 A1 | 6/2017 | Kenzler et al. |
| 2017/0188016 A1 | 6/2017 | Hudman |
| 2017/0219695 A1 | 8/2017 | Hall et al. |
| 2017/0242102 A1 | 8/2017 | Dussan et al. |
| 2017/0242108 A1 | 8/2017 | Dussan et al. |
| 2017/0257617 A1 | 9/2017 | Retterath |
| 2017/0269209 A1 | 9/2017 | Hall et al. |
| 2017/0303789 A1 | 10/2017 | Tichauer et al. |
| 2017/0329010 A1 | 11/2017 | Warke et al. |
| 2017/0343675 A1 | 11/2017 | Oggier et al. |
| 2017/0356796 A1 | 12/2017 | Nishio |
| 2017/0356981 A1 | 12/2017 | Yang et al. |
| 2018/0045816 A1 | 2/2018 | Jarosinski et al. |
| 2018/0059220 A1 | 3/2018 | Irish et al. |
| 2018/0062345 A1 | 3/2018 | Bills et al. |
| 2018/0081030 A1 | 3/2018 | McMahon et al. |
| 2018/0081032 A1 | 3/2018 | Torruellas et al. |
| 2018/0081041 A1 | 3/2018 | Niclass et al. |
| 2018/0081061 A1 | 3/2018 | Mandai et al. |
| 2018/0115762 A1 | 4/2018 | Bulteel et al. |
| 2018/0131449 A1 | 5/2018 | Kare et al. |
| 2018/0167602 A1 | 6/2018 | Pacala et al. |
| 2018/0203247 A1 | 7/2018 | Chen et al. |
| 2018/0205943 A1 | 7/2018 | Trail |
| 2018/0209846 A1 | 7/2018 | Mandai et al. |
| 2018/0259645 A1 | 9/2018 | Shu et al. |
| 2018/0299554 A1 | 10/2018 | Van Dyck et al. |
| 2018/0341009 A1 | 11/2018 | Niclass et al. |
| 2019/0004156 A1 | 1/2019 | Niclass et al. |
| 2019/0011556 A1 | 1/2019 | Pacala et al. |
| 2019/0011567 A1 | 1/2019 | Pacala et al. |
| 2019/0018117 A1 | 1/2019 | Perenzoni et al. |
| 2019/0018118 A1 | 1/2019 | Perenzoni et al. |
| 2019/0018119 A1 | 1/2019 | Laifenfeld et al. |
| 2019/0018143 A1 | 1/2019 | Thayer et al. |
| 2019/0037120 A1 | 1/2019 | Ohki |
| 2019/0056497 A1 | 2/2019 | Pacala et al. |
| 2019/0094364 A1* | 3/2019 | Fine ................. G01S 17/10 |
| 2019/0170855 A1 | 6/2019 | Keller et al. |
| 2019/0178995 A1 | 6/2019 | Tsai et al. |
| 2019/0187075 A1* | 6/2019 | Jach ................. G01N 23/083 |
| 2019/0257950 A1 | 8/2019 | Patanwala et al. |
| 2019/0277952 A1 | 9/2019 | Beuschel et al. |
| 2019/0361404 A1 | 11/2019 | Mautner et al. |
| 2020/0142033 A1 | 5/2020 | Shand |
| 2020/0233068 A1 | 7/2020 | Henderson et al. |
| 2020/0249324 A1 | 8/2020 | Steinberg et al. |
| 2020/0256669 A1 | 8/2020 | Roth et al. |
| 2020/0256993 A1 | 8/2020 | Oggier |
| 2020/0309955 A1 | 10/2020 | Laflaqueire et al. |
| 2020/0314294 A1 | 10/2020 | Schoenlieb et al. |
| 2020/0386890 A1 | 12/2020 | Oggier et al. |
| 2021/0164776 A1 | 6/2021 | Roth et al. |
| 2021/0165083 A1 | 6/2021 | Fine et al. |
| 2022/0099814 A1* | 3/2022 | Finkelstein .......... G01S 7/484 |
| 2022/0146647 A1 | 5/2022 | Sakazume |
| 2022/0244391 A1* | 8/2022 | Mandai ............... G01S 7/4816 |
| 2023/0016025 A1* | 1/2023 | Laifenfeld ........... G01S 17/10 |
| 2023/0058113 A1* | 2/2023 | Laifenfeld ........... G01S 7/4813 |
| 2023/0243975 A1* | 8/2023 | Jaffey ................. G01S 7/4866 |
| | | 356/5.01 |
| 2023/0333217 A1* | 10/2023 | Fine ................... G01S 17/18 |
| 2024/0022391 A1* | 1/2024 | Lee .................... H04L 7/0075 |

FOREIGN PATENT DOCUMENTS

| | | |
|---|---|---|
| CN | 101401107 A | 4/2009 |
| CN | 103763485 A | 4/2014 |
| CN | 103983979 A | 8/2014 |
| CN | 104730535 A | 6/2015 |
| CN | 104914446 A | 9/2015 |
| CN | 105992960 A | 10/2016 |
| CN | 106405572 A | 2/2017 |
| CN | 110609293 A | 12/2019 |
| DE | 202013101039 U1 | 3/2014 |
| DE | 102015013710 A1 | 4/2017 |
| EP | 2157445 A2 | 2/2010 |
| EP | 2322953 A1 | 5/2011 |
| EP | 2469297 A1 | 6/2012 |
| EP | 2477043 A1 | 7/2012 |
| EP | 2827175 A2 | 1/2015 |
| EP | 3285087 A1 | 2/2018 |
| EP | 3318895 A1 | 5/2018 |
| EP | 3370080 A1 | 9/2018 |
| EP | 3521856 A1 | 8/2019 |
| GB | 2492848 A | 1/2013 |
| JP | H02287113 A | 11/1990 |
| JP | H0567195 A | 3/1993 |
| JP | 09197045 A | 7/1997 |
| JP | H10170637 A | 6/1998 |
| JP | H11063920 A | 3/1999 |
| JP | 2011089874 A | 5/2011 |
| JP | 2011237215 A | 11/2011 |
| JP | 2013113669 A | 6/2013 |
| JP | 2014059301 A | 4/2014 |
| JP | 2020197457 A | 12/2020 |
| JP | 7383558 B2 | 11/2023 |
| KR | 101318951 B1 | 10/2013 |
| TW | 202343020 A | 11/2023 |
| WO | 9008946 A1 | 8/1990 |
| WO | 2007144565 A2 | 12/2007 |
| WO | 2010149593 A1 | 12/2010 |
| WO | 2011041040 A1 | 4/2011 |
| WO | 2012154356 A1 | 11/2012 |
| WO | 2013028691 A1 | 2/2013 |
| WO | 2014066178 A1 | 5/2014 |
| WO | 2015199615 A1 | 12/2015 |
| WO | 2016034408 A1 | 3/2016 |
| WO | 2017106875 A1 | 6/2017 |
| WO | 2018122560 A1 | 7/2018 |
| WO | 2020101576 A1 | 5/2020 |
| WO | 2020109378 A1 | 6/2020 |
| WO | 2020201452 A1 | 10/2020 |
| WO | 2022035549 A1 | 2/2022 |
| WO | 2022244322 A1 | 11/2022 |

OTHER PUBLICATIONS

CN Application # 201780097602.5 Office Action dated Mar. 15, 2023.
CN Application # 202010063812.6 Office Action dated Mar. 18, 2023.
KR Application # 1020217025136 Office Action dated Apr. 4, 2023.
U.S. Appl. No. 17/026,365 Office Action dated Jan. 26, 2023.

(56) References Cited

OTHER PUBLICATIONS

CN Application # 201810571820.4 Office Action dated Sep. 9, 2022.
KR Application # 1020220101419 Office Action dated Sep. 28, 2022.
U.S. Appl. No. 17/026,365 Office Action dated Nov. 7, 2022.
U.S. Appl. No. 16/532,513 Office Action dated Nov. 23, 2022.
Zhu Jian, "Research of Simulation of Super-Resolution Reconstruction of Infrared Image", abstract page, Master's Thesis, p. 1, Nov. 15, 2005.
Laifenfeld et al., U.S. Appl. No. 17/189,300, filed Mar. 2, 2021.
Laifenfeld, U.S. Appl. No. 17/512,708, filed Oct. 28, 2021.
Charbon et al., "SPAD-Based Sensors", TOF Range-Imaging Cameras, Springer-Verlag, pp. 11-38, year 2013.
Niclass et al., "A 0.18 um CMOS SoC for a 100m range, 10 fps 200×96 pixel Time of Flight depth sensor", IEEE International Solid- State Circuits Conference—(ISSCC), Session 27, Image Sensors, 27.6, pp. 488-490, Feb. 20, 2013.
Walker et al., "A 128×96 pixel event-driven phase-domain ΔΣ-based fully digital 3D camera in 0.13 μm CMOS imaging technology", IEEE International Solid-State Circuits Conference—(ISSCC), Session 23, Image Sensors, 23.6, pp. 410-412, Feb. 23, 2011.
Niclass et al., "Design and characterization of a 256×64-pixel single-photon imager in CMOS for a MEMS-based laser scanning time-of-flight sensor", Optics Express, vol. 20, issue 11, pp. 11863-11881, May 21, 2012.
Kota et al., "System Design and Performance Characterization of a MEMS-Based Laser Scanning Time-of-Flight Sensor Based on a 256×64-pixel Single-Photon Imager", IEEE Photonics Journal, vol. 5, issue 2, pp. 1-15, Apr. 2013.
Webster et al., "A silicon photomultiplier with >30% detection efficiency from 450-750nm and 11.6 μm pitch NMOS—only pixel with 21.6% fill factor in 130nm CMOS", Proceedings of the European Solid-State Device Research Conference (ESSDERC), pp. 238-241, Sep. 7-21, 2012.
Bradski et al., "Learning OpenCV", first edition, pp. 1-50, O'Reilly Media, Inc, California, USA, year 2008.
Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.
Morbi et al., "Short range spectral lidar using mid-infrared semiconductor laser with code-division multiplexing technique", Technical Digest, CLEO 2001, pp. 491-492, May 2001.
Ai et al., "High-resolution random-modulation cw lidar", Applied Optics, vol. 50, issue 22, pp. 4478-4488, Jul. 28, 2011.
Chung et al., "Optical orthogonal codes: design, analysis and applications", IEEE Transactions on Information Theory, vol. 35, issue 3, pp. 595-604, May 1989.
Lin et al., "Chaotic lidar", IEEE Journal of Selected Topics in Quantum Electronics, vol. 10, issue 5, pp. 991-997, Sep.-Oct. 2004.
IN Application # 202117029897 Office Action dated Mar. 10, 2022.
U.S. Appl. No. 17/189,300 Office Action dated Jun. 4, 2024.
CN Application # 201980090098.5 Office Action dated Dec. 4, 2023.
IN Application # 202117028974 Summons to Hearing dated Dec. 8, 2023.
CN Application # 202010521767.4 Office Action dated Dec. 8, 2023.
CN Application # 201980090030.7 Office Action dated Jan. 5, 2024.
U.S. Appl. No. 16/679,360 Office Action dated Jun. 29, 2022.
EP Application # 22167103.5 Search Report dated Jul. 11, 2022.
CN Application # 201780058088.4 Office Action dated Aug. 23, 2022.
U.S. Appl. No. 16/885,316 Office Action dated Jun. 30, 2022.
U.S. Appl. No. 16/532,513 Office Action dated Aug. 4, 2022.
Zhu et al., "Measurement Method for Real-Time Transmission of Optical Signal Based on Single Photon Detection," Chinese Journal of Lasers, vol. 43, No. 2, pp. 1-6, year 2016.
Yang, "The Study of Phase-Demodulation Range-Finding Techniques Based o SPAD," Chinese Master's Thesis Full-text Database, Engineering Science and Technology, Xiangtan University, pp. 1-63, May 2016.
Zhang, "Structured Light Based Fast and High Accuracy Depth Sensing," China Doctoral Dissertations Full-text Database, Information Science and Technology, University of Science and Technology of China, pp. 1-110, Apr. 2015.
Ionescu et al., "A 3D NIR Camera for Gesture Control of Video Game Consoles," Conference Paper, 2014 IEEE International Conference on Computational Intelligence and Virtual Environments for Measurement Systems and Applications (CIVEMSA), pp. 1-5, year 2014.
U.S. Appl. No. 16/769,346 Office Action dated Aug. 3, 2023.
CN Application # 202010063812.6 Office Action dated Aug. 1, 2023.

* cited by examiner

TIME-OF-FLIGHT DEPTH SENSING WITH IMPROVED LINEARITY

CROSS REFERENCE TO RELATED APPLICATION

This application claims the benefit of U.S. Provisional Patent Application 63/145,504, filed Feb. 4, 2021, which is incorporated herein by reference.

FIELD OF THE INVENTION

The present invention relates generally to systems and methods for depth mapping, and particularly to sensing arrays used in time-of-flight sensing.

BACKGROUND

Time-of-flight (TOF) imaging techniques are used in many depth mapping systems (also referred to as 3D mapping or 3D imaging). In direct TOF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses.

Single-photon avalanche diodes (SPADs), also known as Geiger-mode avalanche photodiodes (GAPDs), are detectors capable of capturing individual photons with very high time-of-arrival resolution, of the order of a few tens of picoseconds. They may be fabricated in dedicated semiconductor processes or in standard CMOS technologies. Arrays of SPAD sensors, fabricated on a single chip, have been used experimentally in 3D imaging cameras.

U.S. Patent Application Publication 2017/0052065, whose disclosure is incorporated herein by reference, describes a sensing device that includes a first array of sensing elements, which output a signal indicative of a time of incidence of a single photon on the sensing element. A second array of processing circuits are coupled respectively to the sensing elements and comprise a gating generator, which variably sets a start time of the gating interval for each sensing element within each acquisition period, and a memory, which records the time of incidence of the single photon on each sensing element in each acquisition period. A controller controls the gating generator during a first sequence of the acquisition periods so as to sweep the gating interval over the acquisition periods and to identify a respective detection window for the sensing element, and during a second sequence of the acquisition periods, to fix the gating interval for each sensing element to coincide with the respective detection window.

SUMMARY

Embodiments of the present invention that are described hereinbelow provide improved apparatus and methods for optical sensing.

There is therefore provided, in accordance with an embodiment of the invention, optical sensing apparatus, which includes a radiation source, which is configured to direct a series of optical pulses toward a target scene. A first array of single-photon detectors is configured to receive optical radiation that is reflected from the target scene and to output electrical pulses in response to photons that are incident thereon. A second array of counters is configured to aggregate and count the electrical pulses output by the single-photon detectors over respective periods indicated by respective gating signals applied to the counters. Control logic is configured to apply the respective gating signals to the counters, in each of a sequence of image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective frame histograms of the electrical pulses output by the single-photon detectors with histogram bins defined by the gating intervals. The control logic is configured to apply different temporal offsets between the optical pulses and the gating signals over the sequence of the image frames and to sum the frame histograms generated with the different temporal offsets so as to compute and output a cumulative histogram.

In a disclosed embodiment, the single-photon detectors include single-photon avalanche diodes (SPADs).

In some embodiments, the control logic is configured to process the cumulative histogram so as to compute a time of flight of the optical pulses to and from the target scene. In one embodiment, the second array of the counters is configured to generate the respective frame histograms for each of a matrix of pixels that is defined by the first array of the single-photon detectors, and the control logic is configured to compute respective cumulative histograms for the pixels in the matrix and to generate a depth map based on the cumulative histograms. Additionally or alternatively, the apparatus includes a frame buffer and readout circuitry, which is configured to read out the frame histograms from the second array of the counters, to adjust the frame histograms so as to compensate for the different temporal offsets, and to store a sum of the adjusted frame histograms for each of the pixels in a corresponding cell of the frame buffer.

Further additionally or alternatively, the apparatus includes aggregation logic, which is coupled to route the electrical pulses output by first groups of the single-photon detectors to respective second groups of the counters, wherein the control logic is configured to apply the respective gating signals to the counters such that in each of the second groups, the electrical pulses output by the single-photon detectors in a corresponding first group are aggregated and counted by different ones of the counters in different, respective ones of the gating intervals.

In a disclosed embodiment, the control logic is configured to apply the respective gating signals to the counters so as to generate a predefined first number of the bins in each of the frame histograms, and to apply a second number of the different temporal offsets between the optical pulses and the gating signals over the sequence of the image frames, wherein the second number is equal to the first number.

There is also provided, in accordance with an embodiment of the invention, optical sensing apparatus, which includes a radiation source, which is configured to direct optical radiation toward a target scene, and a first array of single-photon detectors, which are configured to receive the optical radiation that is reflected from the target scene and to output electrical pulses in response to photons that are incident thereon. A second array of counters is configured to aggregate and count the electrical pulses output by the single-photon detectors over respective periods indicated by respective gating signals applied to the counters. Control logic is configured, in a measurement mode, to drive the radiation source to emit optical pulses and to apply the respective gating signals to the counters, in each of a sequence of image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective histograms of the electrical pulses output by the single-photon detectors with histogram bins defined by the gating intervals. The control logic is configured, in a calibration mode, to drive the radiation source to emit continuous-wave (CW) radiation while applying the respective gating signals to the counters and to process the histograms generated in the calibration mode so as to measure deviations in bin width and timing offset among the histogram bins and to apply the measured deviations in correcting the histograms generated in the measurement mode.

In a disclosed embodiment, the histograms have a predefined number of bins extending over a given measurement interval, and the control logic is configured, in the calibration mode, to collect a first histogram generated by resetting the single-photon detectors continually while the radiation source emits the CW radiation, to collect a second histogram generated by resetting the single-photon detectors only once before each measurement interval while the radiation source emits the CW radiation, and to process both the first and second histograms in order to measure first deviations in the bin width and second deviations in the timing offset.

There is additionally provided, in accordance with an embodiment of the invention, a method for optical sensing, which includes directing a series of optical pulses toward a target scene. Optical radiation that is reflected from the target scene is received in a first array of single-photon detectors, which output electrical pulses in response to photons that are incident thereon. The electrical pulses output by the single-photon detectors are aggregated and counted in a second array of counters over respective periods indicated by respective gating signals applied to the counters. The respective gating signals are applied to the counters in each of a sequence of image frames while applying different temporal offsets between the optical pulses and the gating signals over the sequence of the image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective frame histograms of the electrical pulses output by the single-photon detectors with histogram bins defined by the gating intervals. The frame histograms are summed generated with the different temporal offsets so as to compute and output a cumulative histogram.

The present invention will be more fully understood from the following detailed description of the embodiments thereof, taken together with the drawings in which:

DETAILED DESCRIPTION OF EMBODIMENTS

Overview

Figure 1:
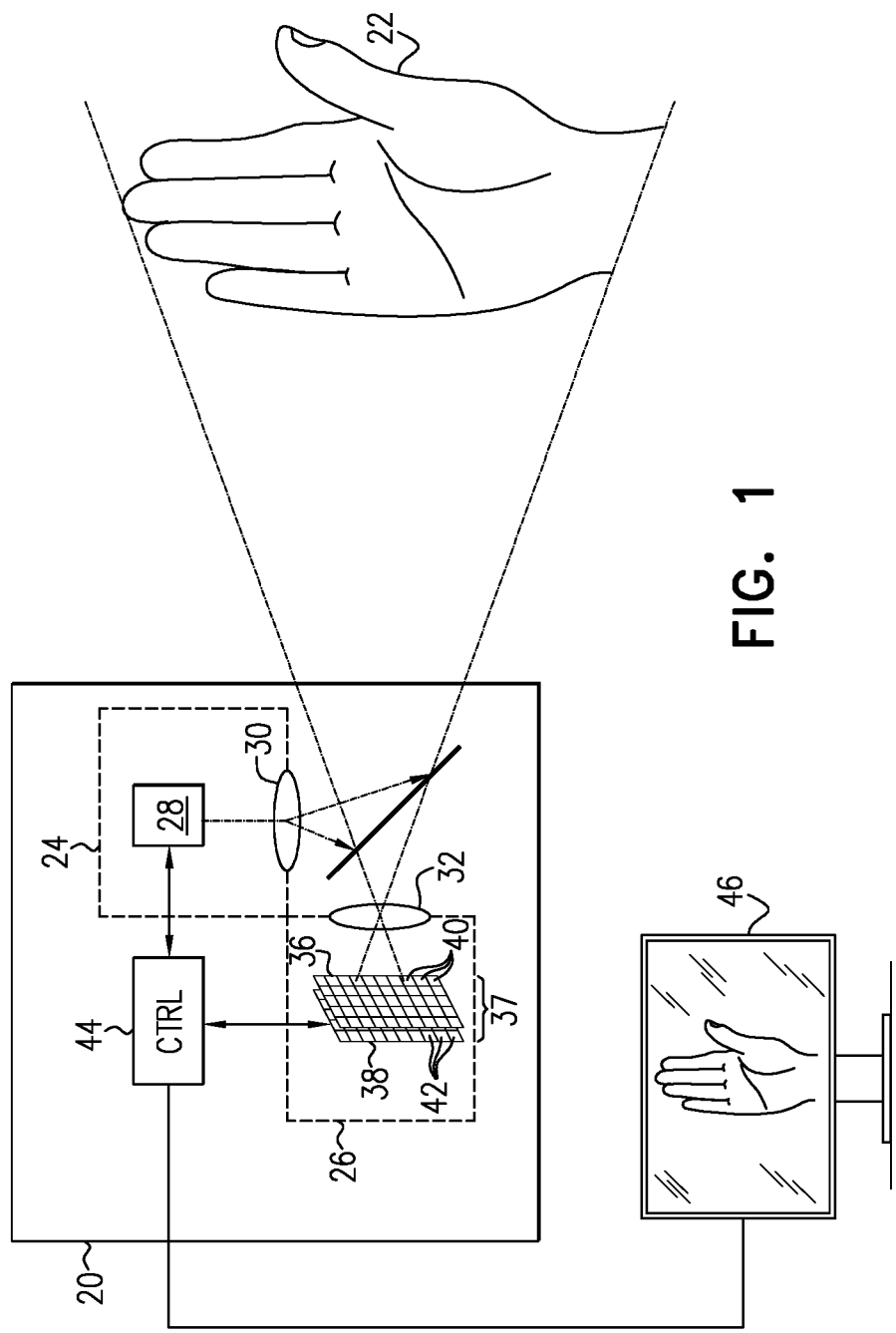
FIG. 1 is a schematic side view of depth mapping apparatus, in accordance with an embodiment of the invention.

The speed and sensitivity of single-photon detectors, such as SPADs, makes them a good choice for TOF imaging. SPAD arrays with integrated control logic and memory, such as those described above in the Background section, are starting to become commercially available. This application describes optical sensing apparatus in which an array of single-photon detectors, such as SPADs, are disposed on a semiconductor substrate and output electrical pulses in response to incident photons. An array of counters, also disposed on the semiconductor substrate, counts the electrical pulses output by the single-photon detectors.

In one mode of operation of this apparatus, each of the counters aggregates and counts the electrical pulses output by a respective group of the detectors. Each counter can be gated to count the pulses it receives during a respective gating interval. In this manner, two or more counters with different gating intervals can be used together to construct a histogram of photon arrival times over the corresponding group of detectors, with each counter generating the value of a corresponding bin of the histogram. The gating intervals can be synchronized with optical pulses emitted by a radiation source in order to measure the times of flight of photons reflected from a target scene, and thus create a three-dimensional (3D) map of the scene. Each group of counters (and the corresponding group of detectors) is associated with a corresponding pixel of the 3D map. This sort of pixel, combining and counting the pulses output by multiple, mutually-adjacent detectors, is referred to as a "super-pixel."

To measure the time of flight at each pixel of the depth map, control logic (such as a programmable processor and/or hardware logic circuits) finds the peak or peaks of the histogram that is constructed by each group of counters. When there is substantial differential nonlinearity (DNL) among the counters, however, the peak location may be distorted or masked by artifacts. This sort of DNL can arise, for example, when the widths and/or start times of the respective gating intervals vary from their nominal, uniform design values. (The width of such a gating interval is also referred to herein as the bin width, or pulse width, of the corresponding histogram bin.) Variations of these sorts can arise, for example, due to process nonuniformities and/or differing trace lengths in the integrated circuit chip on which the counters and associated circuits are formed. Even small amounts of DNL can cause significant distortion in the measured time of flight, particularly in environments in which ambient light gives rise to a high background level in the output of the detectors.

Embodiments of the present invention that are described herein address these problems by compensating for DNL among the bins of the histogram. In some embodiments, such compensation is achieved by dithering the temporal offset between the optical pulses that are used to illuminate the target scene and the gating intervals that are applied to the counters. The dither is chosen so that over a sequence of image frames, counts associated with any given time of flight are aggregated in multiple different bins. The counts are summed over multiple frames while compensating for the dithered temporal offset, with the result that DNL among the counters is averaged out and thus canceled.

In other embodiments, variations in the widths and start times of the gating intervals are measured and then calibrated out of the histograms. For this purpose, the radiation source (which normally, in TOF measurement mode, emits pulses of radiation toward the target scene) is driven to emit continuous-wave (CW) radiation, while the gating signals are applied to the counters. Under these conditions, any variations from uniform response are indicative of DNL and can thus provide a measure of deviations in the bin widths and start times of the histogram bins. These measured deviations are used as calibration factors in correcting the histograms that are then generated in the measurement mode.

System Description

FIG. 1 is a schematic side view of depth mapping apparatus 20, in accordance with an embodiment of the invention. In the pictured embodiment, apparatus 20 is used to generate depth maps of an object 22, for example a part of the body of a user of the apparatus. To generate the depth map, an illumination assembly 24 directs pulses of light toward object 22, and an imaging assembly 26 captures the photons reflected from the object. (The terms "light" and "illumination," as used in the present description and in the claims, refer to optical radiation, which may be in any of the visible, infrared, and ultraviolet ranges; and pulses of light are equivalently referred to as "optical pulses.")

Illumination assembly 24 typically comprises a radiation source 28, such as at least one pulsed laser, which emits short pulses of light, with pulse duration in the picosecond to nanosecond range and high repetition frequency, for example 25 MHz or more. Collection optics 30 direct the light toward object 22. Alternatively, other source configurations, pulse durations and repetition frequencies may be used, depending on application requirements. For example, illumination assembly 24 may emit multiple pulsed beams of light along different, respective axes, so as to form a pattern of spots on object 22. In this case, although the spatial resolution of apparatus 20 in the transverse plane may be reduced, the depth resolution can be enhanced by concentrating the histogram capture and processing resources of imaging assembly 26 in the areas of the spots. Additionally or alternatively, illumination assembly 24 may be capable of emitting CW radiation, for example for purposes of calibration of imaging assembly 26, as described further hereinbelow.

Imaging assembly 26 comprises objective optics 32, which image object 22 onto a sensing array 37, so that photons emitted by illumination assembly 24 and reflected from object 22 are incident on the sensing array. In the pictured embodiment, sensing array 37 comprises sensing circuits 36 and ancillary circuits 38. Sensing circuits 36 comprises an array of single-photon detectors 40, such as SPADs, each of which outputs electrical pulses indicative of the time of incidence of a single photon on the sensing element. Ancillary circuits 38 comprise an array of processing circuits 42, which are coupled respectively to the sensing elements.

Circuits 36 and 38 are disposed on a semiconductor substrate, which may comprise a single chip or two or more separate chips coupled together, for example using chip stacking techniques that are known in the art. Circuits 36 and 38 may be formed on one or more silicon wafers using well-known CMOS fabrication processes, based on SPAD sensor designs that are known in the art, along with accompanying counters and logic as described hereinbelow. Alternatively, the designs and principles of detection that are described herein may be implemented, mutatis mutandis, using other materials and processes. All such alternative implementations are considered to be within the scope of the present invention.

Apparatus 20 is timed to capture TOF information continually over a series of image frames, for example at a rate of thirty frames/sec. In each frame, processing circuits 42 count photons that are incident on detectors 40 in one or more gating intervals and store the respective counts in histogram bins corresponding to the gating intervals. An array of counters in processing circuits 42 generates respective histograms for each of a matrix of pixels that is defined by the array of the single-photon detectors 40. The pixels may be "super-pixels," defined by grouping together a number of the detectors and aggregating the histogram over the entire group, as noted above and described further hereinbelow.

A system controller 44 reads out the individual counter values in the histogram that has been generated for each pixel, computes the times of flight of the optical pulses based on the counter values, and generates an output depth map, comprising the measured TOF—or equivalently, the measured depth value—at each pixel. The depth map is typically conveyed to a receiving device 46, such as a display or a computer or other processor, which segments and extracts high-level information from the depth map. Controller 44 may also set apparatus 20 to capture two-dimensional images, as described in the above-mentioned U.S. patent application Ser. No. 17/079,548.

System controller 44 typically comprises a programmable processor, such as a microprocessor or embedded microcontroller, which is programmed in software or firmware to carry out the functions that are described herein. This software or firmware may be stored in tangible, non-transitory computer-readable media, such as optical, magnetic, or electronic memory media. Alternatively or additionally, at least some of the processing functions of controller 44 may be carried out by hard-wired or programmable digital logic circuits. System controller 44 is a part of the control logic that controls the operation of apparatus 20, together with drive and readout circuits in sensing array 37 and with memory and interface circuits, as described further hereinbelow.

Figure 2:
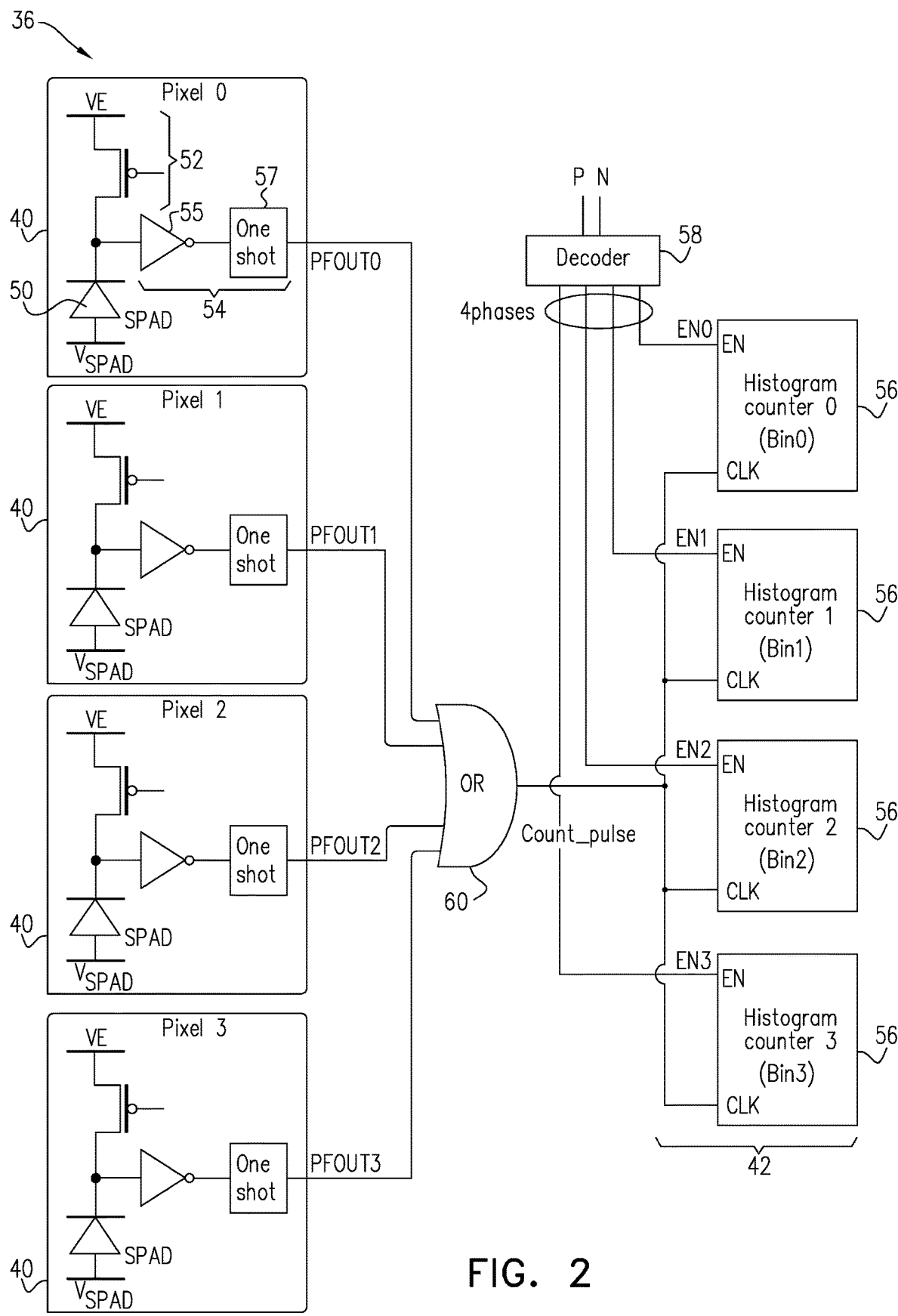
FIG. 2 is a block diagram that schematically shows details of detectors and processing circuits in a sensing array, in accordance with an embodiment of the invention.

FIG. 2 is a block diagram that schematically shows details of detectors 40 and processing circuits 42 in sensing array 37, in accordance with an embodiment of the invention. The circuits 36 and 38 in this figure belong to a single super-pixel, which aggregates four neighboring single-photon detectors 40 (labeled as pixels 0, 1, 2 and 3). Each such single-photon detector comprises a SPAD 50, together with a biasing and reset circuit 52 and an output circuit 54, comprising (in the present example) an inverter 55 followed by a monostable multivibrator 57, also known as a "one shot" circuit, which outputs electrical pulses in response to photons that are incident on the SPAD. An array of counters 56 aggregate and count the electrical pulses output by detectors 40 over respective periods, referred to as gating intervals, which are defined by respective gating signals (also referred to as "enable pulses," and labeled EN0, EN1, . . . ) that are applied to the counters by a decoder 58. This decoder serves as a part of the control logic of apparatus 20.

An OR gate 60 serves as aggregation logic, to route the electrical pulses output by each group of single-photon detectors 40 to a respective group of counters 56. In this example, four single-photon detectors 40 grouped as a "super-pixel," corresponding to a single pixel in the depth map generated by apparatus 20, share a group of four counters 56. Sensing array 37 is divided into a matrix of super-pixels of this sort. Decoder 58 applies respective gating signals to counters 56 such that the electrical pulses output by all the detectors in the group are aggregated and counted by different ones of the counters in different, respective gating intervals, relative to each optical pulse that is output by radiation source 28.

The group of counters 56 thus generates, over a sequence of optical pulses, a histogram of the electrical pulses output by single-photon detectors 40, with histogram bins defined by the different gating intervals. Since only four counters are shown in this simplified example, the histogram will have only four bins. Alternatively, larger numbers of counters may be grouped in order to generate histograms with finer temporal resolution. The number of single-photon detectors in each super-pixel, whose outputs are aggregated and counted by each group of counters, may be the same as the number of the counters in the group, or it may be different, depending on the desired spatial resolution and available chip "real estate." In one embodiment (not shown in the figures), each group of counters counts pulses output by a single detector and generates a histogram accordingly. In this case, the "super-pixel" corresponds to a single pixel in array 36.

Figure 3:
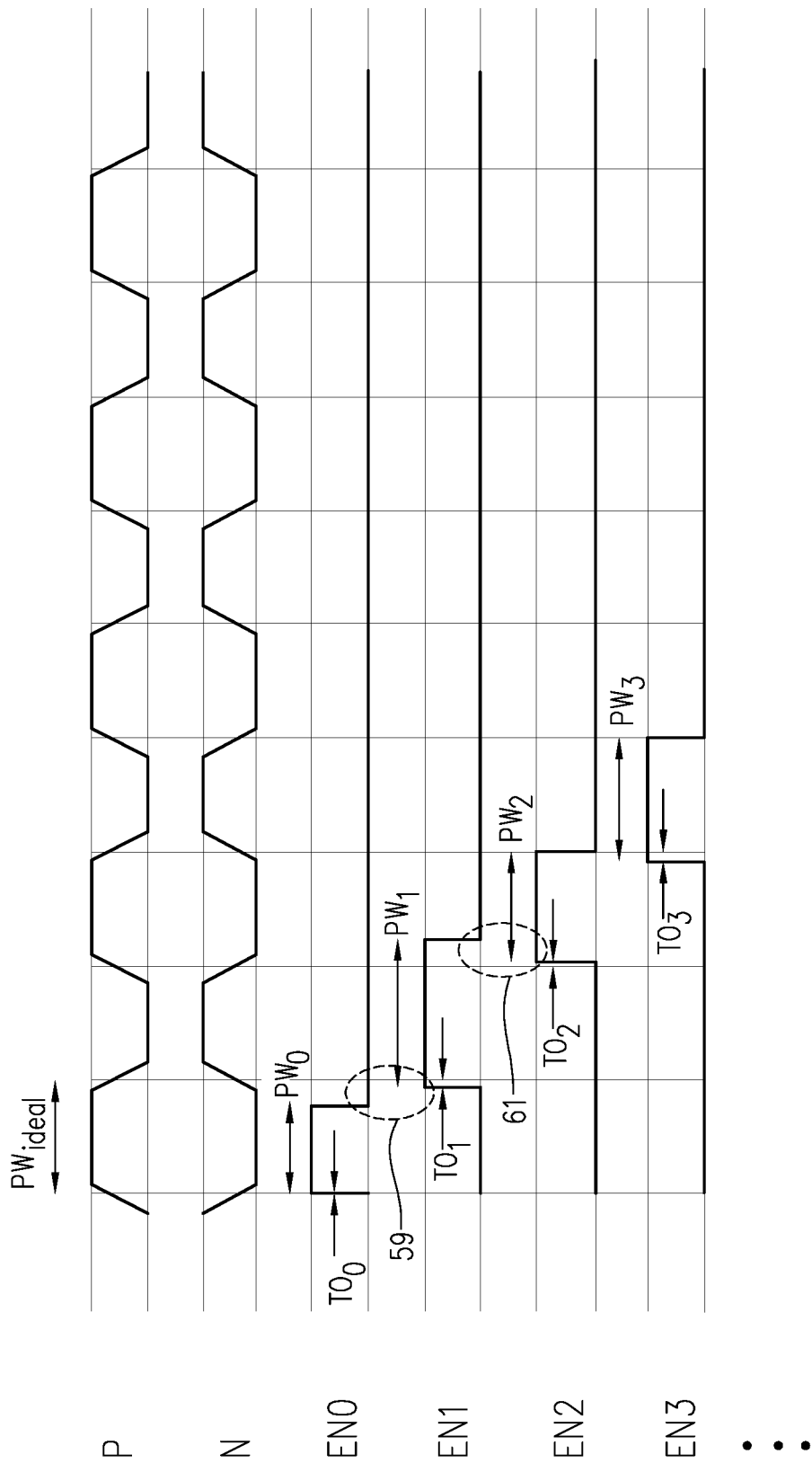
FIG. 3 is an electrical timing diagram, which schematically shows timing signals applied to the circuits of FIG. 2, in accordance with an embodiment of the invention.

FIG. 3 is an electrical timing diagram, which schematically shows timing signals applied to the circuits of FIG. 2, in accordance with an embodiment of the invention. Decoder 58 receives positive (P) and negative (N) phases of a clock signal. In response to these signals, decoder 58 generates the gating signals (EN0, EN1, EN2, . . . ) that are applied respectively to counters 0, 1, 2, . . . , thus defining the respective, successive gating intervals. Ideally, all the gating signals would have the same nominal pulse width (PW) and would have start times precisely at integer multiples of the pulse width.

In practice, however, as shown in FIG. 3, the pulse widths can vary from bin to bin, and the start times can vary by different timing offsets (labeled $TO_0$, $TO_1$, $TO_2$, $TO_3$) relative to the nominal start times at integer multiples of the nominal pulse width. There may thus be dead spaces 59 or overlaps 61 between successive gating intervals. Because of the varying pulse widths, some of the histogram counters will count electrical pulses over longer intervals than others, and will thus tend to have higher count levels for a given level of incident radiation intensity. Because of the time offsets, the locations of peaks in the histogram can be distorted, thus leading to errors in the computed time of flight.

DNL Cancellation by Pulse Dithering

Figure 4:
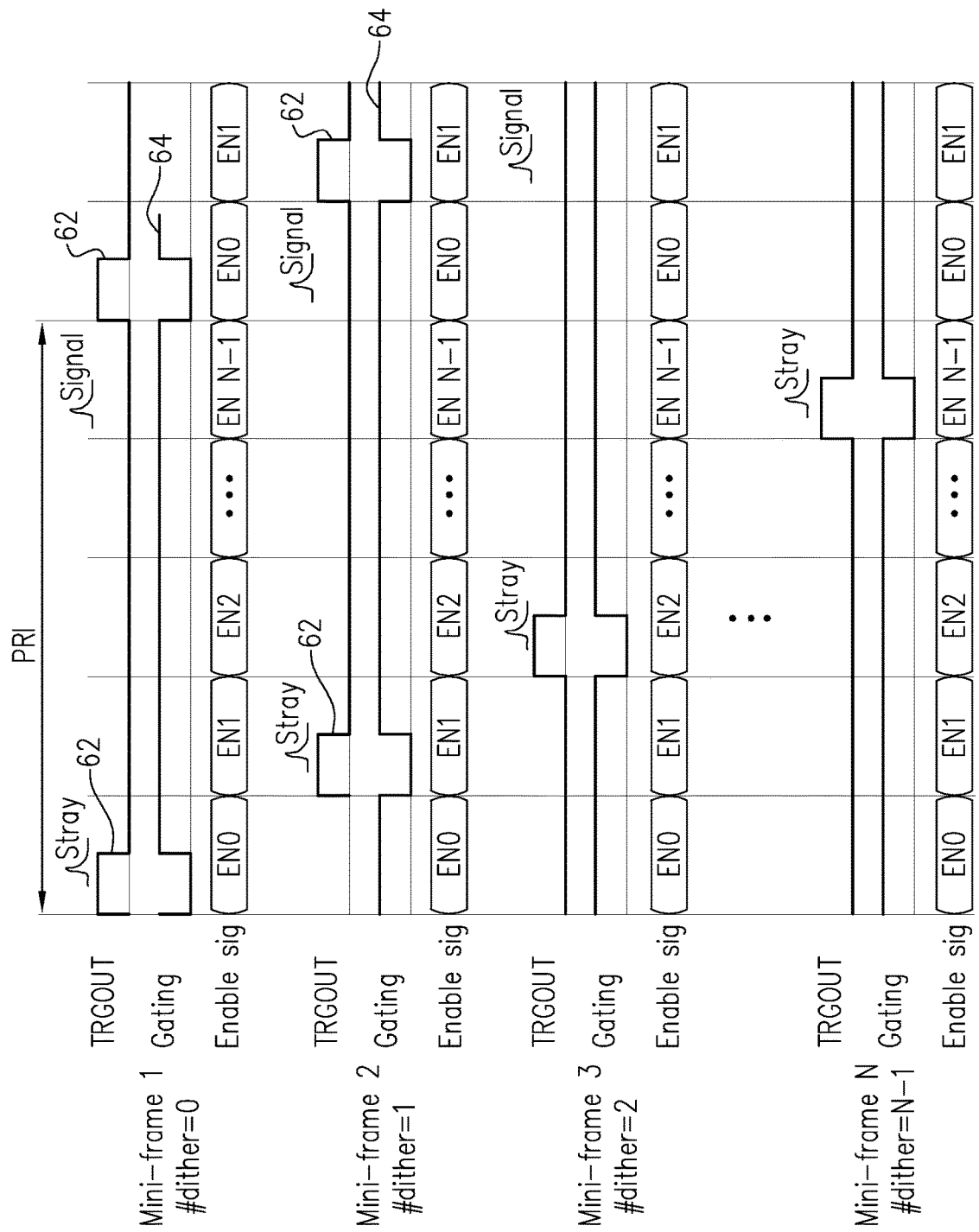
FIG. 4 is an electrical timing diagram, which schematically illustrates a method for eliminating histogram distortion, in accordance with an embodiment of the invention.

FIG. 4 is an electrical timing diagram, which schematically illustrates a method, in accordance with an embodiment of the invention, for eliminating histogram distortion that can arise due to variations in pulse width and timing offset of the gating intervals of counters 56 (FIG. 2). In this embodiment, over a sequence of image frames, system controller 44 applies different temporal offsets between the optical pulses output by radiation source 28 and the gating signals applied by decoder 58 counters 56. In each such frame, radiation source 28 outputs a sequence of optical pulses separated by a predefined pulse repetition interval (PRI); and counters 56 generate a respective frame histogram for the temporal offset of this frame. These frames are referred to in FIG. 4 as "mini-frames."

Controller 44 sums the frame histograms generated with the different temporal offsets so as to compute and output a cumulative histogram over the entire sequence. Because of the varying temporal offsets, for any given bin the cumulative histogram, a different counter 56 in each frame will count the pulses that are to go into the given bin. Consequently, variations in the bin widths and start times will average out over the sequence of frames.

In the example shown in FIG. 4, the number of bins in the histograms, N, is equal to the number of frames in the sequence. (The frames are referred to in this figure as mini-frames 1 through N, and the N bins in the histogram are gated by respective signals 66 [EN0, EN1, . . . , EN N−1] output by decoder 58.) Alternatively, to generate the cumulative histograms at a faster rate, the number of frames in the sequence may be less than the number of histogram bins, although in this case the DNL may not be averaged out as effectively.

A trigger signal 62 (TRGOUT) is applied by controller to trigger radiation source 28, with a time offset (dither) that is incremented by one bin in each successive frame. The PRI in this example is equal to the cumulative duration of the bins of each histogram, i.e., N times the gating interval. The added time offset in each frame is equal to the bin width, i.e., equal to the gating interval of counters 56. Thus, over the full sequence of frames, the offset will cycle over all the bins in the histogram. A gating signal 64 to biasing and reset circuit 52 (FIG. 2) activates single-photon detectors 40 in each frame immediately after the optical pulse, thereby eliminating histogram counts due to stray reflections within apparatus 20.

Assuming the target scene to be substantially stationary over the period of the sequence of "mini-frames," the delay between the optical pulse and the signal received by each super-pixel due to the optical radiation reflected from the target scene will be fixed. Therefore, in each mini-frame the counts due to the reflected radiation received by each super-pixel will be aggregated by a different counter, as illustrated by the shifting "signal" pulse in FIG. 4.

Figure 5:
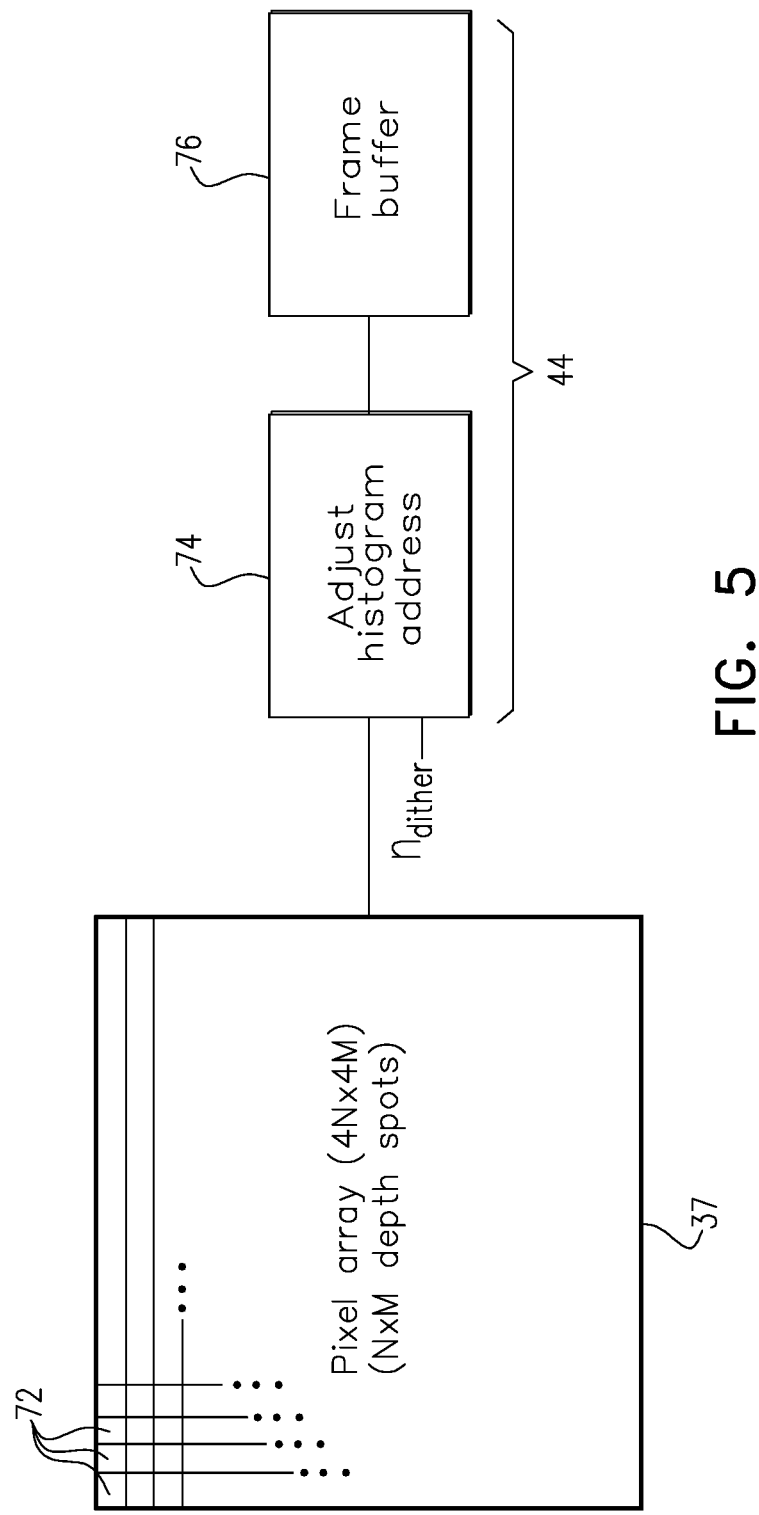
FIG. 5 is block diagram that schematically shows elements of an imaging assembly and system controller that are used in computing a cumulative histogram over a sequence of image frames, in accordance with an embodiment of the invention.

FIG. 5 is block diagram that schematically shows elements of imaging assembly 26 and system controller 44 that are used in computing a cumulative histogram over a sequence of image frames, in accordance with an embodiment of the invention. In this example, sensing array 37 comprises a matrix of 4N×4M single-photon detectors 40, which are grouped into N×M super-pixels 72. In other words, each super-pixel 72 aggregates the pulses that are output by sixteen single-photon detectors 40 in a corresponding group of counters 56. In alternative embodiments, each super-pixel may aggregate the pulses from a larger or smaller group of detectors, wherein each group may form a square or other rectangular or may comprise a non-rectangular cluster of the detectors.

Following each frame, at a given temporal offset between the optical pulses and the histogram bins, readout circuitry 74 reads out the frame histograms from the array of counters, adjusts the frame histograms so as to compensate for the temporal offset, and then stores the accumulated histogram in a frame buffer 76. In other words, following each frame, for each super-pixel 72, readout circuitry 74 reads out the values of all the histogram bins, and shifts the bins into alignment with the previous frames, taking into account the dither applied in the frame. The resulting shifted histogram is summed with the accumulated value for this super-pixel in frame buffer 76, until all of the frames in the sequence have been read out and summed.

Figure 6:
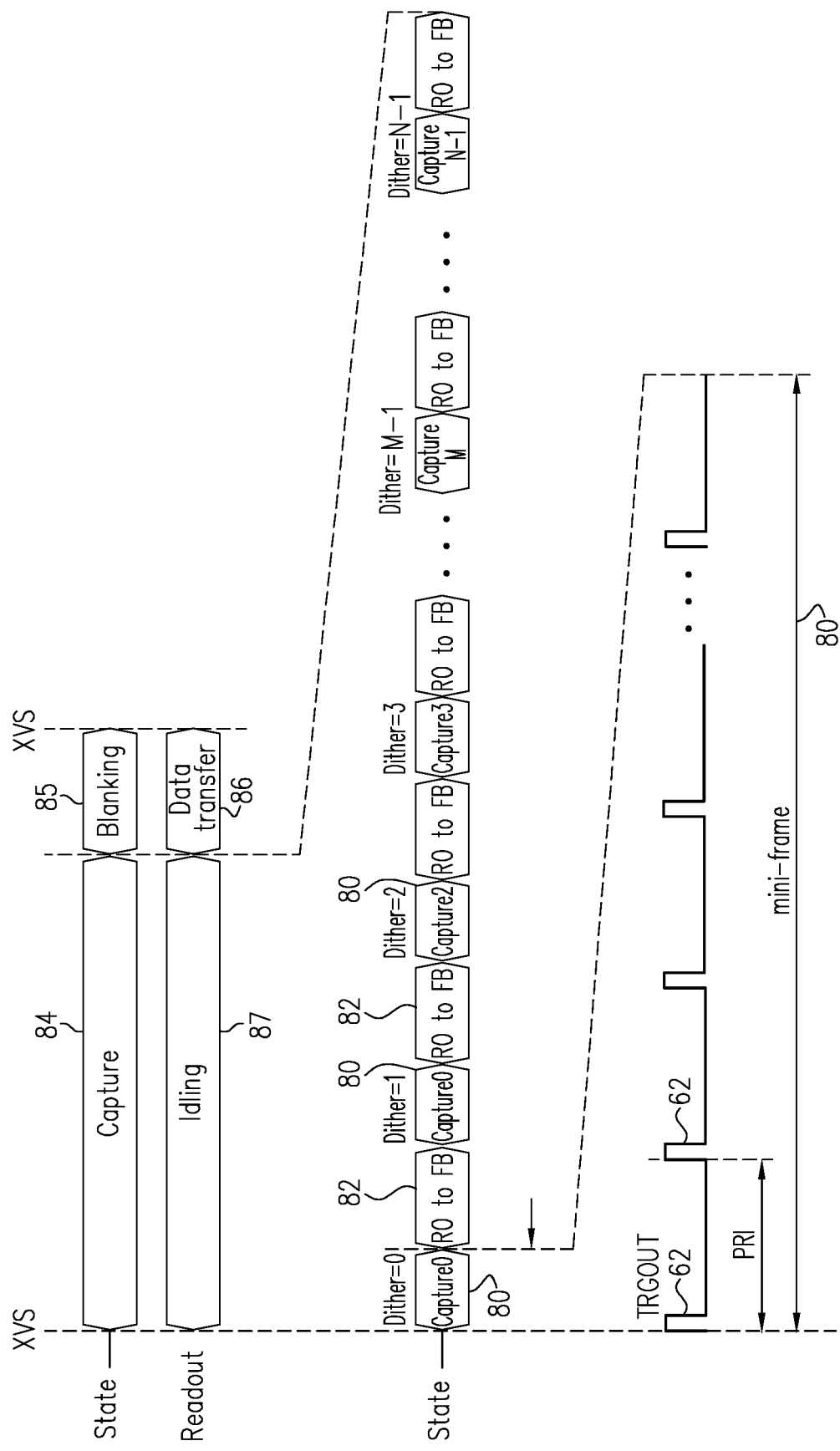
FIG. 6 is a timing diagram that schematically shows stages in a process of computing a cumulative histogram over a sequence of image frames, in accordance with an embodiment of the invention.

FIG. 6 is a timing diagram that schematically shows the stages in this process, in accordance with an embodiment of the invention. Starting from the bottom of the figure, in each mini-frame 80, radiation source 28 is triggered by signal 62 to emit a certain number of pulses at a given temporal offset relative to the gating intervals of counters 56, which thus capture a frame histogram at this given offset. This process is repeated with different temporal offsets (i.e., different dither values) over a sequence of mini-frames 80. Each mini-frame 80 is followed by a readout interval 82, in which readout circuitry 74 reads the histograms, shifts the bins, and accumulates the result in frame buffer 76.

The alternating mini-frames 80 and readout intervals 82 continue over an extended capture interval 84, until all the desired values of temporal offset have been covered (N different values in this example). At this point, the cumulative histogram, over the entire sequence of mini-frames 80, is read out of frame buffer 76, during a data transfer interval 86 (which serves as a blanking interval 85 of the detector array). The readout circuits return to an idling state 87 during the next extended capture interval 84. Extended capture intervals 84 and data transfer intervals 86 may be repeated, for example, at a rate of 30 frames/sec, meaning that the duration of each mini-frame 80 together with its readout interval 82 is on the order of 1 ms. Controller 44 estimates the time of flight of the photons received at each super-pixel 72 based on the peak or peaks in the cumulative histogram for that super-pixel and generates a depth map of the target scene based on the times of flight.

DNL Calibration Using CW Light

In an alternative embodiment of the present invention, apparatus 20 has a dedicated calibration mode, in which the variations among counters 56 in bin width and timing offset (as shown in FIG. 3) are measured. Controller 44 is thus able to compute calibration factors, which it applies in correcting for the DNL when apparatus 20 is operating in its normal measurement mode.

For purposes of calibration, controller 44 drives radiation source 28 to emit continuous-wave (CW) radiation toward a uniform calibration target. (An additional, dedicated radiation source may be provided for this purpose if necessary.) While illuminating the calibration target in this manner, controller 44 drives decoder 58 to apply the same gating signals to counters 56 as in the measurement mode. The controller reads out and processes the histograms generated under this CW illumination in order to measure the deviations in bin width and timing offset among the histogram bins, and then applies the measured deviations in generating the calibration factors for correcting the histograms generated in the measurement mode.

Figure 7A:
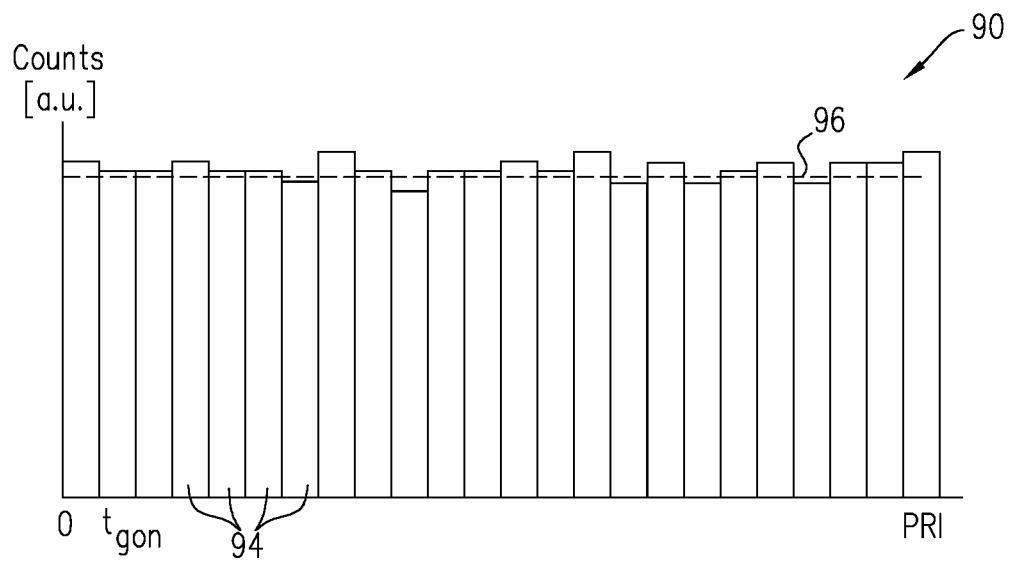
FIGS. 7A and 7B are histograms that schematically illustrate a method for calibration of histograms, in accordance with an embodiment of the invention.
Figure 7B:
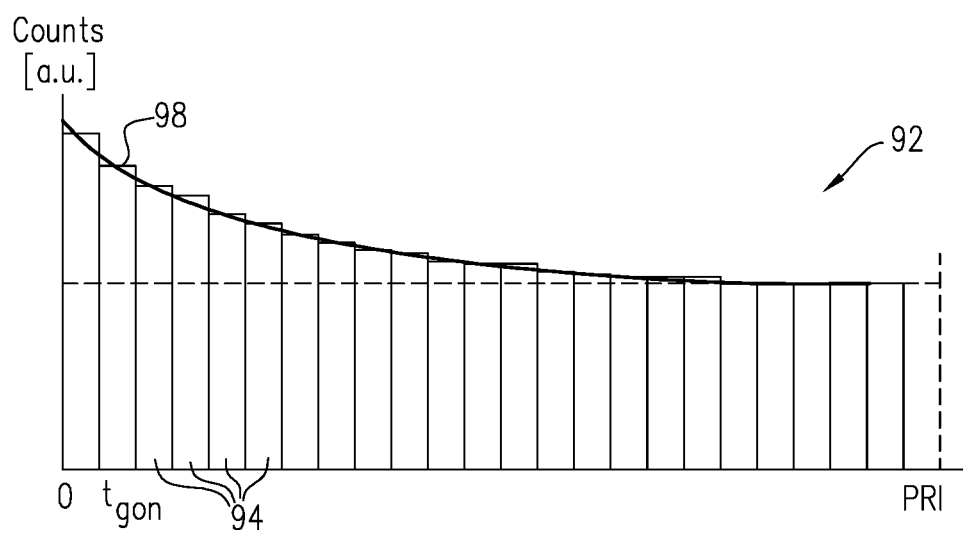

FIGS. 7A and 7B are histograms 90, 92 that schematically illustrate these calibration measurements, in accordance with an embodiment of the invention. Bins 94 of the histograms are collected respectively by counters 56 for each super-pixel in array 37. The vertical scale (counts) in these figures is arbitrary. Histogram 90 is used to measure variations in the bin widths, while histogram 92 is used to measure time offsets of the bins. Single-photon detectors 40 are assumed to comprise SPADs 50, which are irradiated with an intensity such that each SPAD will output, on average, λ pulses/sec with a recovery time DT after each pulse. As a representative example, λ=20 million counts/sec (20 Mcps), and DT=3 ns.

To generate histogram 90, SPADs 50 are reset continually while radiation source 28 emits the CW radiation. The average number of counts per bin 94 can be estimated as $c_{ave}=1/(1+\lambda DT_{ave})$, as shown by a line 96 in FIG. 7A. The deviation of the width $PW_i$ of any given bin i, relative to the average bin width $PW_{ave}$, is proportional to the ratio of the count $c_i$ in the bin relative to the average count: $PW_i=PW_{ave}(C_i/C_{ave})$.

To generate histogram 92, single-photon detectors 40 are controlled so that each SPAD 50 is reset only once before each measurement interval of the histogram. Thus, the SPAD has effectively infinite recovery time after each pulse that it emits and will contribute only a single count in each measurement interval (marked on the time axis as "PRI"). In this case, assuming all the bin widths were equal and the time offsets were uniform, the counts per bin 94 would drop exponentially, at a rate given by $e^{-\lambda t}$, as shown by a curve 98 in FIG. 7B. The time offset $TO_i$ of each bin can then be estimated as follows:

$$TO_i = \frac{1}{\lambda}\log\left(\frac{c_i/n_{PRI}}{\lambda e^{-\lambda PW_i} - 1}\right)$$

Here $n_{PRI}$ is the number of bins in the histogram. Thus, the timing offset can be calibrating using histogram 92 together with the bin width and count information derived from histogram 90.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical sensing apparatus, comprising:
   a radiation source, which is configured to direct a series of optical pulses toward a target scene;
   a first array of single-photon detectors, which are configured to receive optical radiation that is reflected from the target scene and to output electrical pulses in response to photons that are incident thereon;
   a second array of counters, which are configured to aggregate and count the electrical pulses output by the single-photon detectors over respective periods indicated by respective gating signals applied to the counters; and
   control logic, which is configured to apply the respective gating signals to the counters, in each of a sequence of image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective frame histograms of the electrical pulses output by the single-photon detectors with histogram bins defined by the gating intervals, wherein the control logic is configured to apply different temporal offsets between the optical pulses and the gating signals over the sequence of the image frames and to sum the frame histograms generated with the different temporal offsets so as to compute and output a cumulative histogram.

2. The apparatus according to claim 1, wherein the single-photon detectors comprise single-photon avalanche diodes (SPADs).

3. The apparatus according to claim 1, wherein the control logic is configured to process the cumulative histogram so as to compute a time of flight of the optical pulses to and from the target scene.

4. The apparatus according to claim 3, wherein the second array of the counters is configured to generate the respective frame histograms for each of a matrix of pixels that is defined by the first array of the single-photon detectors, and the control logic is configured to compute respective cumulative histograms for the pixels in the matrix and to generate a depth map based on the cumulative histograms.

5. The apparatus according to claim 4, and comprising a frame buffer and readout circuitry, which is configured to read out the frame histograms from the second array of the counters, to adjust the frame histograms so as to compensate for the different temporal offsets, and to store a sum of the adjusted frame histograms for each of the pixels in a corresponding cell of the frame buffer.

6. The apparatus according to claim 1, and comprising aggregation logic, which is coupled to route the electrical pulses output by first groups of the single-photon detectors to respective second groups of the counters, wherein the control logic is configured to apply the respective gating signals to the counters such that in each of the second groups, the electrical pulses output by the single-photon detectors in a corresponding first group are aggregated and counted by different ones of the counters in different, respective ones of the gating intervals.

7. The apparatus according to claim 1, wherein the control logic is configured to apply the respective gating signals to the counters so as to generate a predefined first number of the bins in each of the frame histograms, and to apply a second number of the different temporal offsets between the optical pulses and the gating signals over the sequence of the image frames, wherein the second number is equal to the first number.

8. Optical sensing apparatus, comprising:
a radiation source, which is configured to direct optical radiation toward a target scene;
a first array of single-photon detectors, which are configured to receive the optical radiation that is reflected from the target scene and to output electrical pulses in response to photons that are incident thereon;
a second array of counters, which are configured to aggregate and count the electrical pulses output by the single-photon detectors over respective periods indicated by respective gating signals applied to the counters; and
control logic, which is configured, in a measurement mode, to drive the radiation source to emit optical pulses and to apply the respective gating signals to the counters, in each of a sequence of image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective histograms of the electrical pulses output by the single-photon detectors with histogram bins defined by the gating intervals,
wherein the control logic is configured, in a calibration mode, to drive the radiation source to emit continuous-wave (CW) radiation while applying the respective gating signals to the counters and to process the histograms generated in the calibration mode so as to measure deviations in bin width and timing offset among the histogram bins and to apply the measured deviations in correcting the histograms generated in the measurement mode.

9. The apparatus according to claim 8, wherein the single-photon detectors comprise single-photon avalanche diodes (SPADs).

10. The apparatus according to claim 8, wherein the control logic is configured to process the histograms generated in the measurement mode so as to compute a time of flight of the optical pulses to and from the target scene.

11. The apparatus according to claim 8, wherein the histograms have a predefined number of bins extending over a given measurement interval, and wherein the control logic is configured, in the calibration mode, to collect a first histogram generated by resetting the single-photon detectors continually while the radiation source emits the CW radiation, to collect a second histogram generated by resetting the single-photon detectors only once before each measurement interval while the radiation source emits the CW radiation, and to process both the first and second histograms in order to measure first deviations in the bin width and second deviations in the timing offset.

12. A method for optical sensing, comprising:
directing a series of optical pulses toward a target scene;
receiving optical radiation that is reflected from the target scene in a first array of single-photon detectors, which output electrical pulses in response to photons that are incident thereon;
aggregating and counting the electrical pulses output by the single-photon detectors in a second array of counters over respective periods indicated by respective gating signals applied to the counters;
applying the respective gating signals to the counters in each of a sequence of image frames while applying different temporal offsets between the optical pulses and the gating signals over the sequence of the image frames, so as to cause different ones of the counters to aggregate and count the electrical pulses output by one or more of the single-photon detectors over different, respective gating intervals relative to each of the optical pulses, such that the second array of the counters generates, for the image frames in the sequence, respective frame histograms of the electrical pulses output by the single-photon detectors with histogram bins defined by the gating intervals; and
summing the frame histograms generated with the different temporal offsets so as to compute and output a cumulative histogram.

13. The method according to claim 12, wherein the single-photon detectors comprise single-photon avalanche diodes (SPADs).

14. The method according to claim 12, and comprising processing the cumulative histogram so as to compute a time of flight of the optical pulses to and from the target scene.

15. The method according to claim 14, wherein aggregating and counting the electrical pulses comprises generating the respective frame histograms for each of a matrix of pixels that is defined by the first array of the single-photon detectors, and summing the frame histograms comprises computing respective cumulative histograms for the pixels in the matrix and generating a depth map based on the cumulative histograms.

16. The method according to claim 15, wherein summing the frame histograms comprises reading out the frame histograms from the second array of the counters, adjusting the frame histograms so as to compensate for the different temporal offsets, and storing a sum of the adjusted frame histograms for each of the pixels for use in computing the time of flight.

17. The method according to claim 12, wherein aggregating and counting the electrical pulses comprises routing the electrical pulses output by first groups of the single-photon detectors to respective second groups of the counters, and applying the respective gating signals to the counters such that in each of the second groups, the electrical pulses output by the single-photon detectors in a corresponding first group are aggregated and counted by different ones of the counters in different, respective ones of the gating intervals.

18. The method according to claim 12, wherein applying the respective gating signals comprises applying the gating signals to the counters so as to generate a predefined first number of the bins in each of the frame histograms, and applying a second number of the different temporal offsets between the optical pulses and the gating signals over the sequence of the image frames, wherein the second number is equal to the first number.

* * * * *